United States Patent
Bender

(10) Patent No.: US 11,109,073 B2
(45) Date of Patent: Aug. 31, 2021

(54) IMAGE COMPRESSION AND TRANSMISSION FOR HEADS-UP DISPLAY (HUD) REHOSTING

(71) Applicant: Rockwell Collins, Inc., Cedar Rapids, IA (US)

(72) Inventor: Joseph Bender, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 16/744,724

(22) Filed: Jan. 16, 2020

(65) Prior Publication Data

US 2021/0227263 A1  Jul. 22, 2021

(51) Int. Cl.
*H04N 19/93* (2014.01)
*H04L 29/06* (2006.01)

(52) U.S. Cl.
CPC ............ *H04N 19/93* (2014.11); *H04L 67/38* (2013.01)

(58) Field of Classification Search
CPC ................. H04N 19/93; H04L 67/38
See application file for complete search history.

(56) References Cited

U.S. PATENT DOCUMENTS

| | | | |
|---|---|---|---|
| 9,498,694 B2 | 11/2016 | Huston et al. | |
| 10,469,873 B2 | 11/2019 | Pang et al. | |
| 2002/0010734 A1 | 1/2002 | Ebersole et al. | |
| 2004/0032971 A1* | 2/2004 | Nagaoka | G06T 7/74 |
| | | | 382/103 |
| 2006/0282855 A1 | 12/2006 | Margulis | |
| 2007/0146235 A1* | 6/2007 | Nolan | G01C 21/365 |
| | | | 345/7 |
| 2012/0262558 A1* | 10/2012 | Boger | G02B 27/0093 |
| | | | 348/61 |
| 2013/0278760 A1 | 10/2013 | Beams et al. | |
| 2014/0292803 A1* | 10/2014 | Cook | A63F 13/355 |
| | | | 345/619 |
| 2015/0220814 A1* | 8/2015 | Verkasalo | G06Q 30/0201 |
| | | | 382/103 |
| 2017/0243403 A1 | 8/2017 | Daniels et al. | |
| 2017/0359442 A1 | 12/2017 | Jordan | |
| 2018/0053284 A1* | 2/2018 | Rodriguez | G06F 3/14 |
| 2018/0122143 A1* | 5/2018 | Ellwood, Jr. | H04N 9/31 |

(Continued)

OTHER PUBLICATIONS

Disclosed Anonymously: "Replication of reconfigurable heads up display in auxiliary display", Redearch Disclosure, Kenneth Mason Publications, Hampshire, UK, GB, vol. 526, No. 445, Feb. 1, 2008 (Feb. 1, 2008), page 163, XP007137976, ISSN: 0374-4353 * the whole document*.

(Continued)

*Primary Examiner* — Jared Walker

(57) ABSTRACT

A heads-up display (HUD) rehosting apparatus is disclosed. In embodiments, the HUD rehosting apparatus includes graphics processors for generating HUD display imagery and a primary display unit or display surface. The HUD rehosting apparatus includes an image capture module for grabbing the displayed HUD images and compressing the images into image data frames via run-length encoding. The compressed data frames are transmitted to secondary rehosting devices capable of decoding the image data and displaying the HUD imagery, e.g., projected onto additional surfaces or via wearable devices.

12 Claims, 2 Drawing Sheets

(56) References Cited

U.S. PATENT DOCUMENTS

2018/0232195 A1    8/2018  Jaegal et al.
2018/0293703 A1*  10/2018  Vaidyanathan ........... G06T 1/60
2018/0374267 A1    12/2018  Yurkin
2019/0378305 A1    12/2019  Fitzgerald et al.
2020/0042263 A1*  2/2020  Iyer ........................ G06F 3/147

OTHER PUBLICATIONS

Extended Search Report for European Application No. 21152031.7 dated Apr. 7, 2021, 10 pages.

\* cited by examiner

IMAGE COMPRESSION AND TRANSMISSION FOR HEADS-UP DISPLAY (HUD) REHOSTING

TECHNICAL FIELD

The subject matter disclosed by the instant application is directed generally to avionics systems and more particularly to heads-up display (HUD) systems.

BACKGROUND

Vehicular simulators may use a variety of display devices to realistically simulate the experience of operating an aircraft or other vehicle without actually doing so. For example, a simulator may include a heads-up display (HUD) capable of displaying flight or instrument information to the simulator "pilot" or operator, e.g., on a simulated forward window. In order to accurately replicate a cockpit interior to the simulator "pilot", however, it may be necessary to replicate the HUD image or other graphical representations elsewhere within a simulator or cockpit (e.g., to provide a left-side or right-side "out the window" view).

SUMMARY

A heads-up display (HUD) apparatus is disclosed. In embodiments, the HUD apparatus includes graphics processors for generating a sequence or stream of display images. The HUD apparatus includes a capture module for compressing the generated display images according to run-length encoding (RLE) algorithms and transmitting the compressed data frames via physical or wireless network connections to HUD rehosting devices.

A HUD rehosting device is also disclosed. In embodiments, the HUD rehosting device includes a receiver module for receiving compressed data frames via physical or wireless network protocols. The receiver module decodes the data frames according to RLE algorithms to generate HUD display imagery. The HUD rehosting device includes a display surface or device (e.g., projectors, AR/VR wearable devices) for displaying the decoded display imagery to a user.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1:
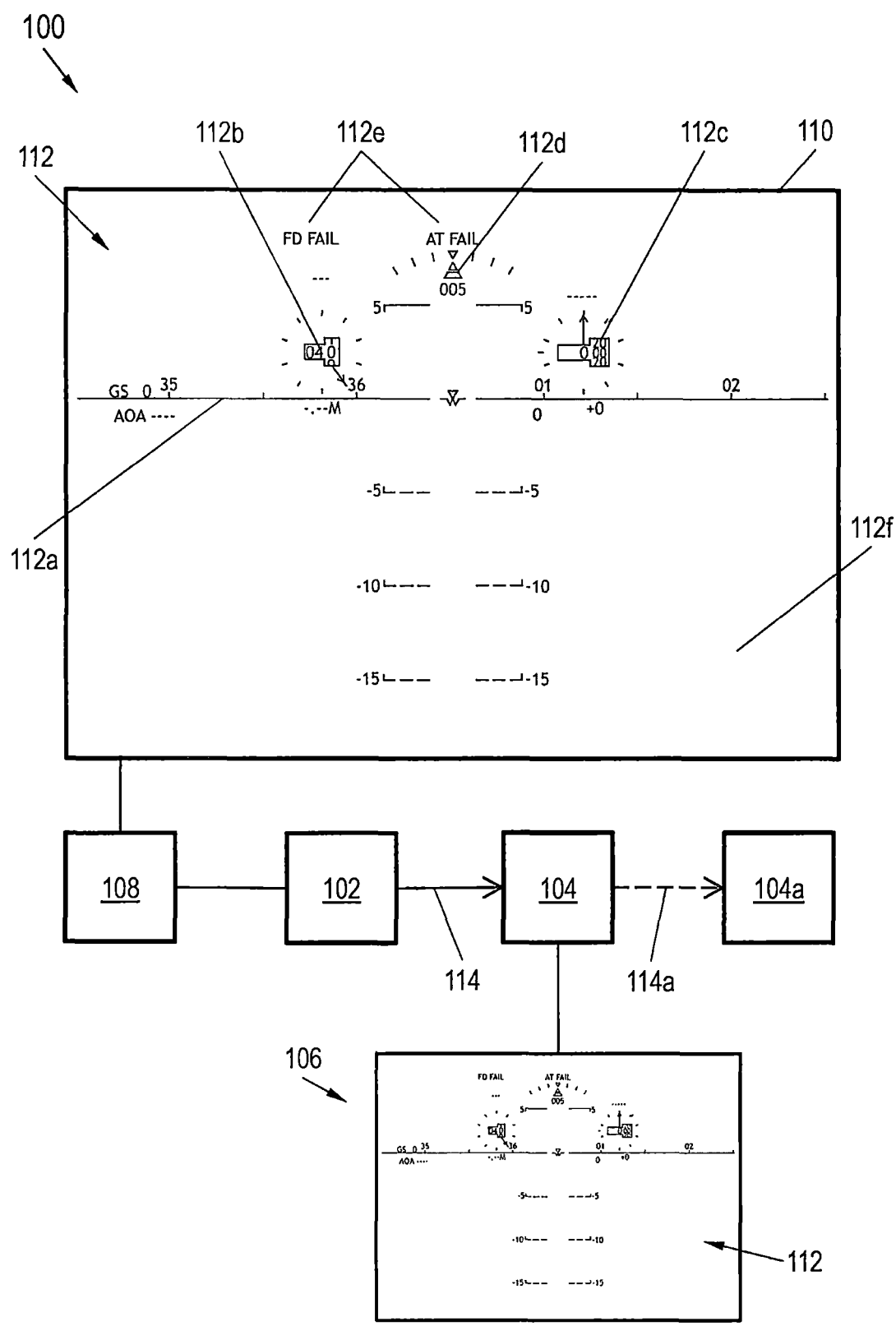
FIG. 1 is a diagrammatic illustration of a heads-up display (HUD) rehosting apparatus in accordance with example embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Referring to FIG. 1, a heads-up display (HUD) rehosting apparatus 100 is disclosed. The HUD rehosting apparatus 100 may include a capture module 102, a remote receiver 104, and a remote display device 106.

In embodiments, the HUD system may include graphics processors 108 capable of generating HUD imagery for display by a main HUD display device 110. For example, the main HUD display device 110 may project the generated HUD images (112) onto a forward surface directly within the field of view of a pilot or user (e.g., as opposed to conventional primary flight displays (PFD) which may be positioned below the horizontal with respect to the user, such that the user must look down to view the PFD). The HUD rehosting apparatus 100 may allow the replication of generated HUD imagery 112 on other interior surfaces or via other display devices. HUD images 112 may be monochrome (e.g., 8-bit green or amber on black), low-resolution representations of, e.g., an artificial horizon 112a, airspeed 112b, altitude 112c, heading 112d, and instrument statuses 112e with significant amounts of reliable black space 112f. In some embodiments, the main HUD display device 110 may superimpose HUD images 112 over another image stream, e.g., enhanced vision or synthetic vision feeds.

In embodiments, the capture module 102 may include processors capable of receiving the generated HUD imagery 112 and encoding each image into a compact network frame for transmission to the remote receiver 104 and display by the remote display device 106. For example, the graphics processors 108 may generate a continuous sequence of HUD images 112, sending each HUD image to the capture module 102 as well as the main HUD display device 110. The capture module 102 may compress each successive HUD image 112 via simplified run-length encoding (RLE) algorithms into a small amount of network frames (e.g., User Datagram Protocol (UDP), Transmission Control Protocol (TCP)). For example, the capture module 102 may sample a first pixel color within a HUD image 112 and tally identical pixels as it scans across the image. When a unique pixel color is found, the color and length of the originally sampled first pixel may be recorded as compressed data; the process may repeat until the end pixel is reached.

In some embodiments, the scanning of monochrome HUD images 112 incorporating large amounts of blank space 112f (and, e.g., optimization based on the behavior and capabilities of the remote display device 106) may result in highly condensed encoded image data. For example, the compact nature of the generated HUD images 112 and the use of RLE encoding may result in an extremely high compression ratio (e.g., 96% or higher) and minimal processing overhead for image encoding. In some embodiments, a HUD image 112 may be compressed into a single network frame without the need for capture cards, special hardware, or commercial off the shelf (COTS) compression algorithms or licensed encoders. In some embodiments, more complex image data may be compressed by, e.g., generating palettes based on common colors and/or reducing the image quality.

In embodiments, the capture module 102 may transmit (114) the compressed network frames to the remote receiver 104 via physical or wireless network protocols. For example, the remote receiver 104 may include processors for decoding the received network frames back into HUD images 112. The decoded HUD images 112 may be displayed by the remote display device 106.

In some embodiments, the HUD rehosting apparatus 100 may be embodied within a single computing device. In some embodiments, the capture module 102 and remote receiver 104 may be embodied in a standalone computing device capable of receiving a real avionics video stream of HUD images 112 for display or encoding via the capture module. For example, encoded image data may be forwarded on by the remote receiver 104 via physical or wireless link (114a) to additional remote receive and display units 104a (e.g., playback devices).

Figure 2:
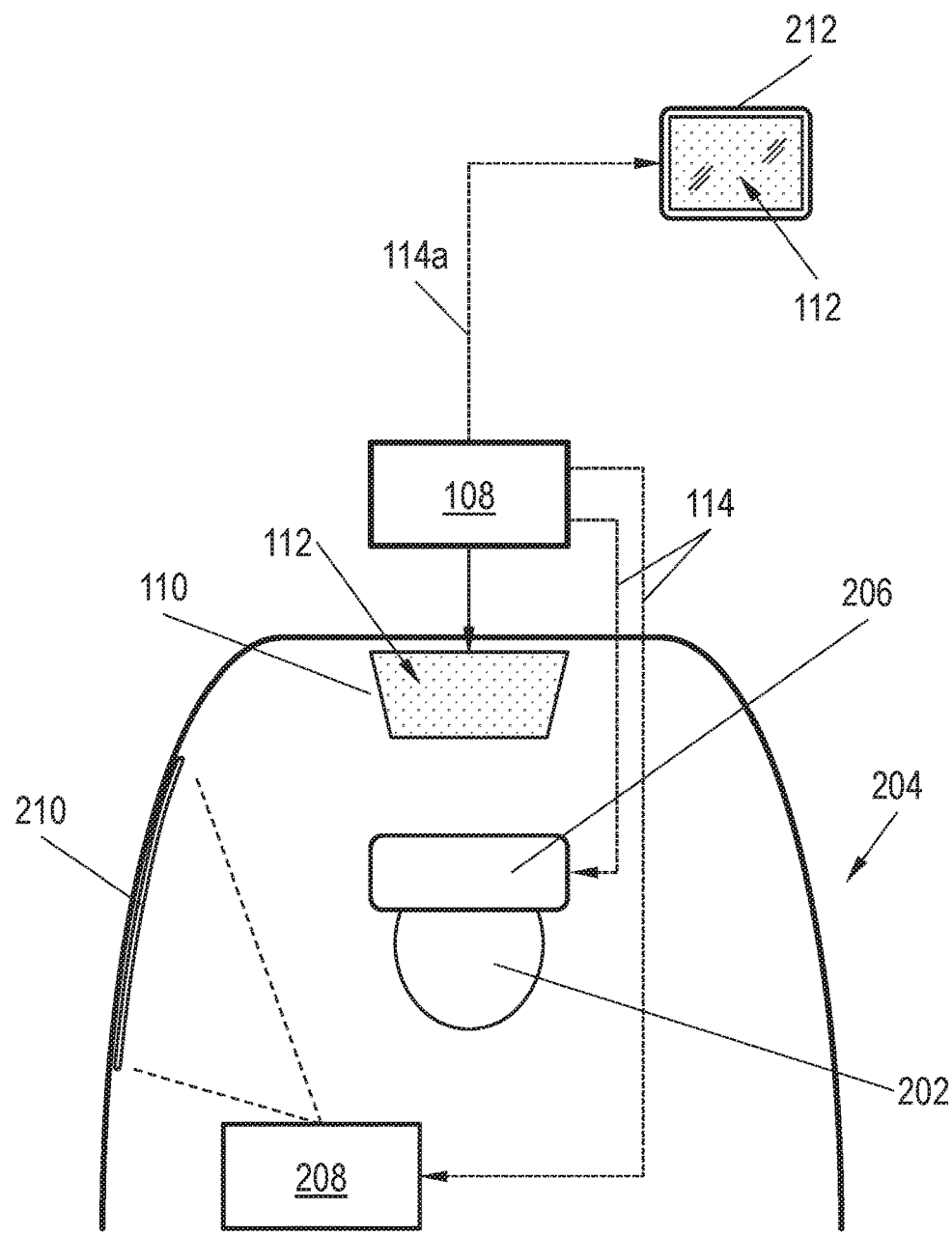
FIG. 2 is a diagrammatic illustration of a simulator incorporating the HUD rehosting apparatus of FIG. 1.

Referring to FIG. 2, the HUD rehosting apparatus 100a may be implemented and may function similarly to the HUD rehosting apparatus 100 of FIG. 1, except that the HUD rehosting apparatus 100a may transmit (114) encoded HUD image data as network frames to one or more remote rehosting devices representing alternative fields of view (FOV) for a simulator pilot 202 (e.g., operator, user). For example, the graphics processors 108 and main HUD display device 110 may be deployed inside a vehicular simulator 204, the main HUD display device representing a forward FOV for the pilot 202, e.g., projected onto a forward surface of the simulator 204.

In embodiments, the HUD rehosting device 100a may compress HUD imagery 112 displayed by the main HUD display device 110 into network frames (e.g., image data) and wirelessly transmit (114) the image data to a head-worn display 206 (HWD) worn by the simulator pilot 202, e.g., a wearable augmented reality (AR) or virtual reality (VR) viewing device capable of providing the simulator pilot with a realistic visual representation of a vehicular cockpit. For example, the HWD 206 may decode and superimpose the HUD images 112 over an AR or VR feed, e.g., generated by enhanced vision or synthetic vision systems.

In some embodiments, the HUD rehosting device 100a may wirelessly transmit (114) compressed and encoded image data to a display projector 208. For example, the display projector 208 may decode the compressed image data and project the resulting HUD images 112 onto an interior surface 210 (e.g., non-forward) of the simulator 204, e.g., a lateral interior surface, such that the HUD images are projected onto an out-of-window side view relative to the simulator pilot 202. In some embodiments, the HUD rehosting device 100a may further transmit (114a) the compressed and encoded image data to additional desktop or tablet devices (212) external to the simulator 204, e.g., for the use of instructors or other interested persons viewing the HUD imagery 112 in parallel with the simulator pilot 202.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

I claim:

1. A heads-up display (HUD) apparatus, comprising:
   one or more graphics processors configured to generate at least one display image;
   a main heads-up display (HUD) unit operatively coupled to the one or more graphics processors, the main HUD unit configured to display the at least one display image to at least one user;
   and
   at least one capture module in communication with the graphics processors, the capture module configured to:
   generate one or more data frames by compressing the generated display image according to at least one run length encoding (RLE) algorithm;
   and transmit the generated data frames to at least one rehosting device according to at least one network protocol.

2. The HUD apparatus of claim 1, wherein:
the at least one rehosting device includes at least one of an augmented reality (AR) viewer and a virtual reality (VR) viewer.

3. The HUD apparatus of claim 1, wherein the one or more data frames generated by the capture module includes at least one display image compressed into a single data frame.

4. The HUD apparatus of claim 1, wherein the one or more data frames include at least one of a TCP network frame and a UDP network frame.

5. The HUD apparatus of claim 1, wherein the at least one display image is a monochrome image.

6. The HUD apparatus of claim 1, wherein the capture module is configured to transmit the generated data frames to the at least one rehosting device via at least one wireless network protocol.

7. The HUD apparatus of claim 1, wherein:
the apparatus is embodied within a vehicular simulator configured to emulate the cockpit of a vehicle;
and
the display unit is located at a first location within the vehicular simulator;
and
the at least one rehosting device is located at a second location within the vehicular simulator.

8. The HUD apparatus of claim 1, wherein the rehosting device is a first rehosting device configured to transmit the generated data frames to at least one second rehosting device according to the at least one network protocol.

9. A heads-up display (HUD) rehosting apparatus, comprising:
a receiver module configured to:
receive one or more data frames according to at least one network protocol;
and
generate at least one display image by decoding the one or more data frames according to at least one run-length encoding (RLE) algorithm;
and
a HUD display device in communication with the receiver module, the display device configured to present the at least one display image to at least one user.

10. The HUD rehosting apparatus of claim 9, wherein:
the apparatus is embodied within a vehicular simulator configured to emulate a moving vehicle;
and
the display device includes a projector configured to project the at least one display image onto at least one interior surface of the vehicular simulator.

11. The HUD rehosting apparatus of claim 9, wherein the display device includes at least one of an augmented reality (AR) viewer and a virtual reality (VR) viewer wearable by the user.

12. The HUD rehosting apparatus of claim 9, wherein the rehosting apparatus is a first rehosting apparatus and the receiver module is configured to transmit the one or more data frames to at least one second rehosting apparatus according to the at least one network protocol.

* * * * *